Aug. 4, 1959 P. E. BADER 2,897,969
STRAINER CONSTRUCTIONS
Filed Aug. 26, 1957

INVENTOR.
Paul Bader
BY Roy E Petherbridge
Atty.

United States Patent Office 2,897,969
Patented Aug. 4, 1959

2,897,969

STRAINER CONSTRUCTIONS

Paul Ernst Bader, Esslingen (Neckar), Mettingen, Germany, assignor to Ekco Products Company, Chicago, Ill., a corporation of Illinois Application August 26, 1957, Serial No. 680,361

6 Claims. (Cl. 210—471)

The present invention relates to strainers and more particularly to a novel supporting attachment for household type bowl shaped strainers.

Strainers of the type indicated generally feature a pair of supporting ears projecting laterally from the upper rim of the strainer and adapted to rest on the rim of a dish or the like into which the contents of the strainer are being filtered. These ears are usually defined by integral extensions of a wire frame at the upper rim of the strainer body and project outwardly through suitable openings provided in an annular binding ring or band in which the wire frame is rigidly confined.

In accordance with the present invention, such supporting ears are incorporated in a separate stand or bail of arcuately curved shape generally conforming to the contour of the strainer body portion extending along the band, which bail is hinged to the strainer band for limited swinging movement between upward and downward positions about an axis transverse of the strainer bowl and at right angles to the longitudinal axis of the strainer handle. When the bail is swung into an upward position, the ears are adapted to rest on the rim of a dish or vessel in the conventional manner. When the bail is swung into a downward position, the ears serve as legs having downward engagement with a supporting surface, such as the top of a cabinet or the like, to prevent tilting movement of the strainer about an axis transverse of the strainer bowl and at right angles to the axis of swinging movement of the bail, as well as to maintain the underside of the strainer out of contact with such supporting surface.

The above and other advantageous features of this invention will hereinafter more fully appear with reference to the accompanying drawing in which.

Figure 1:
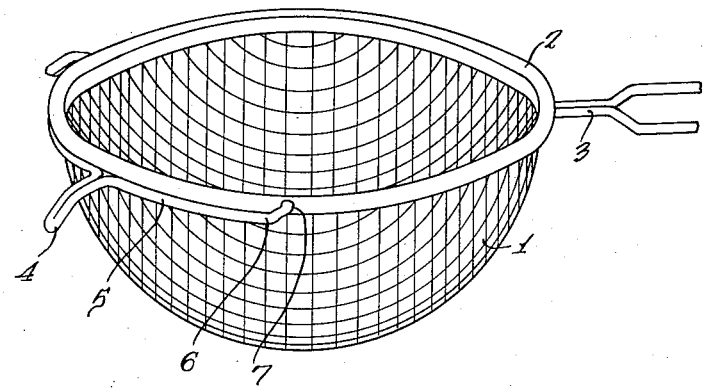
Fig. 1 is a fragmentary top perspective view of a strainer embodying the features of this invention, showing the ears of the supporting frame in upwardly swung position.

A strainer representing a preferred embodiment of this invention as shown in the drawings, includes a strainer bowl 1 having an annular binding ring or band 2 at the upper edge thereof. Reference numeral 3 denotes a length of wire having a portion thereof enclosed by said band 2 and a second portion protruding outwardly therefrom and bent to provide a handle.

In accordance with the present invention, means for resting the strainer on the rim of a dish or the like include a pair of ears 4 defined by integral outwardly projecting extensions of a resilient wire bail 5. Opposite end portions of the wire bail 5 are bent inwardly to provide ends 6 adapted to be supported for swinging movement in openings 7 formed in the band 2. It will be noted that the openings 7 are so spaced apart circumferentially of the band 2 as to define axially aligned bearings or pivotal positions along a straight line transverse of the bowl 1 and at right angles to a line drawn diametrically of the band 2 in alignment with the longitudinal axis of the handle 3. The bail 5 is preferably normally stressed into a semi-circularly curved shape to bias the opposed ends 6 into positions at a distance apart less than a straight line distance between the openings 7 in the band. Thus when the ends 6 of the bail 5 are operatively supported in the openings 7 of the band 2, and the bail is in upwardly swung position alongside the band 2, as shown in Fig. 1, the band 2 presents a downwardly facing shoulder with which the bail 5 is engageable to limit upward swinging movement of the bail 5 while the tension exerted by the bail 5 against the surface of the strainer bowl opposite thereto is sufficient to yieldably resist any tendency of the bail 5 to move downwardly from such position under force of gravity.

Figure 2:
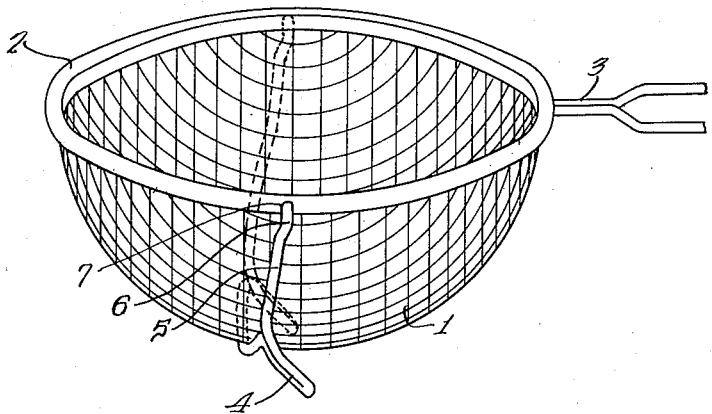
Fig. 2 is a similar view showing the ears of the supporting frame in downwardly swung position.

The strainer can be placed on a table or other supporting surface in the position shown in Fig. 2 by engaging one of the ears 4 and pulling the same downwardly so as to move the bail 5 into a downwardly swung position. In this position, the ears 4 provide support at two spaced apart points parallel to the axis of swinging movement of the bail 5 which are operative to prevent tilting of the strainer in opposite directions lengthwise of such axis. It is also to be noted that the ears 4 in such downwardly swung position of the bail 5 maintain the bowl of the strainer in raised relation to the table or other supporting surface thereby keeping the contents of the strainer out of contact with such supporting surface.

It is desirable to provide means to limit the extent of downward swinging movement of the bail 5. It is, for example, expedient to provide stops or pins on the band 2 with which the bail 5 is engageable to limit such downward swinging movement of the bail. However, as illustrated in the drawings, it is preferred to shape and support the bail 5 in such a manner that its path of downward swinging movement is obstructed by the bottom portion of the strainer bowl lying slightly forward of a diametrical plane at right angles to the longitudinal axis of the handle. It will be observed from the drawings that the openings 7 are also located forward of such a plane whereby the openings 7 occupy opposed positions along a line in forwardly spaced parallel relation to a line drawn diametrically of the strainer bowl and at right angles to the longitudinal axis of the handle.

The wire bail 5 is also preferably normally stressed into a curved shape as to position its ends 6 less than the straight line distance between the openings 7. Thus the bail 5, when swung about an axis defined by the ends 6 while supported in the openings 7 of the band 2 into an upwardly swung position alongside the band 2, as shown in Fig. 1, the tension exerted by the bail 5 against the surface of the bowl opposite thereto is sufficient to prevent unintentional movement of the bail out of such position. The ends 6 may be suitably headed at terminals thereof within the band 2 to prevent accidental withdrawal of the ends 6 from the openings 7 in the band.

What is claimed is:

1. In a strainer, a bowl shaped strainer body, a band at the rim of the strainer, a wire bail connected to said band for swinging movement between upward and downward positions and engageable with the underside of the band when in upward position, a pair of ears formed integrally with said bail and extending outwardly from said bowl, said ears when in downward position being simultaneously engageable with a supporting surface below the underside of the bowl to limit tilting of the strainer body about an axis at right angles to the axis of swinging movement of the bail while said latter axis is in horizontal position.

2. In a strainer as defined in claim 1, wherein a pair of transversely aligned openings are formed in the band and the bail is provided with inwardly bent end portions for reception in said holes provided in the band.

3. In a strainer as defined in claim 2, wherein the bail is of resilient material and internally stressed to position said ends of the bail at a distance apart less than the straight line distance between said openings in the band.

4. In a strainer as defined in claim 1, wherein the surface of the strainer bowl at a point which is forward of the downward most surface of the bowl provides an abutment with which the opposite surface of the wire bail is engageable to limit downward swinging movement of the bail toward said downward position.

5. In a strainer as defined in claim 2, wherein the surface of the strainer bowl at a point which is forward of the downward most surface of the bowl provides an abutment with which the opposite surface of the wire bail is engageable to limit downward swinging movement of the bail toward said downward position.

6. In a strainer as defined in claim 2, wherein said openings in the band are located forwardly of a line drawn diametrically of the bowl and at right angles to the longitudinal axis of the handle.

References Cited in the file of this patent
UNITED STATES PATENTS

| | | |
|---|---|---|
| 1,153,090 | McCarthy | Sept. 7, 1915 |
| 2,589,156 | Smithson | Mar. 11, 1952 |